United States Patent
Kaneko et al.

(10) Patent No.: US 10,760,525 B2
(45) Date of Patent: Sep. 1, 2020

(54) MEMBER HAVING SLIDING CONTACT SURFACE

(71) Applicant: HONDA MOTOR CO., LTD, Minato-ku, Tokyo (JP)

(72) Inventors: Daisuke Kaneko, Wako (JP); Masakatsu Satoh, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/342,480

(22) PCT Filed: Oct. 20, 2016

(86) PCT No.: PCT/JP2016/004643
§ 371 (c)(1),
(2) Date: Apr. 16, 2019

(87) PCT Pub. No.: WO2018/073849
PCT Pub. Date: Apr. 26, 2018

(65) Prior Publication Data
US 2020/0049099 A1 Feb. 13, 2020

(51) Int. Cl.
*F02F 1/20* (2006.01)
*F16J 10/04* (2006.01)

(52) U.S. Cl.
CPC .............. *F02F 1/20* (2013.01); *F16J 10/04* (2013.01)

(58) Field of Classification Search
CPC ...... F02F 1/20; F02F 1/004; F02F 1/08; F02F 1/16; F02F 1/163; F02F 1/166; F16J 10/04
See application file for complete search history.

(56) References Cited

U.S. PATENT DOCUMENTS

2003/0192501 A1* 10/2003 Ishikawa .................. F02F 1/20
123/193.2

FOREIGN PATENT DOCUMENTS

| JP | 2002138896 A | 5/2002 |
| JP | 2003286895 A | 10/2003 |
| JP | 2004100645 A | 4/2004 |
| JP | 4678802 B2 | 4/2011 |

OTHER PUBLICATIONS

English translation of International Search Report for International Application No. PCT/JP2016/004643, dated Nov. 29, 2016, 2 pages.

* cited by examiner

*Primary Examiner* — Jacob M Amick
(74) *Attorney, Agent, or Firm* — Armstrong Teasdale LLP

(57) ABSTRACT

A member having a sliding contact surface that exerts a reduced frictional force when making sliding contact with a prescribed member and retains the lubricating oil more uniformly is provided. The sliding contact surface is a honed surface having flat plateau parts and groove parts. As calculated in regard to the sliding contact surface by using a mean line derived from a cross-sectional curve of the sliding contact surface in accordance with ISO 13565-1, a ten-point average roughness is 0.6-7.0 μm, a load length ratio at a cut level of 20% is 60-98%, an effective load roughness is 0-1 μm, and a mean value of intervals between the groove parts having a depth of 0.2 μm or greater from the mean line is 79-280 μm.

2 Claims, 10 Drawing Sheets

MEMBER HAVING SLIDING CONTACT SURFACE

CROSS-REFERENCE TO RELATED APPLICATIONS

This application is a U.S. National Phase Application of PCT/JP2016/004643, filed Oct. 20, 2016, the contents of which are hereby expressly incorporated by reference in its entirety.

TECHNICAL FIELD

The present invention relates to a member having a sliding contact surface configured to be in a sliding contact with a prescribed member, and particularly relates to a cylinder block of an internal combustion engine.

BACKGROUND ART

In a reciprocating engine, which is one type of an internal combustion engine, a piston undergoes a reciprocating motion within a cylinder bore provided in a cylinder block. During the reciprocating motion, the outer peripheral surface of the piston and the inner peripheral wall surface of the cylinder bore slidingly contact each other, whereby a frictional force is generated between the outer peripheral surface of the piston and the inner peripheral wall surface of the cylinder bore. The frictional force causes energy loss, and therefore, it is preferred to make the inner peripheral wall surface of the cylinder bore as flat as possible to suppress the frictional force between the piston and the cylinder bore. However, if the inner peripheral wall surface of the cylinder bore is made flat, lubricating oil cannot be retained between the outer peripheral surface of the piston and the inner peripheral wall surface of the cylinder bore, and this tends to cause seizure between the piston and the cylinder bore due to a frictional heat between the piston and the cylinder bore.

Thus, there is known a cylinder block in which the inner peripheral wall surface of the cylinder bore is formed with substantially flat plateau surfaces and groove parts for retaining lubricating oil for the purpose of reducing the frictional force between the piston and the cylinder bore while retaining the lubricating oil between the outer peripheral surface of the piston and the inner peripheral wall surface of the cylinder bore (see Patent Document 1, for example).

PRIOR ART DOCUMENT(S)

Patent Document(s)

Patent Document 1: JP4678802B

SUMMARY OF THE INVENTION

Task to be Accomplished by the Invention

However, in the cylinder block according to the prior art, expected results were not necessarily obtained. As a result of research of the inventors, it was revealed that there was insufficient consideration on what shapes the groove parts should have and at what density the groove parts should be formed in order to obtain an optimum result.

In view of such prior art problems and an insight of the inventors, an object of the present invention is to provide a member having a sliding contact surface such that the sliding contact surface exerts a reduced frictional force when making sliding contact with a prescribed member and retains the lubricating oil more uniformly.

Means to Accomplish the Task

To achieve the above object, there is provided a member (2) having a sliding contact surface (40) configured to make sliding contact with a prescribed member (4) via a lubricant, wherein the sliding contact surface is a honed surface having flat plateau parts and groove parts, and wherein, as calculated in regard to the sliding contact surface by using a mean line derived from a cross-sectional curve of the sliding contact surface in accordance with ISO 13565-1, a ten-point average roughness is 0.6-7.0 µm, a load length ratio at a cut level of 20% is 60-98%, an effective load roughness is 0-1 µm, and a mean value of intervals between the groove parts having a depth of 0.2 µm or greater from the mean line is 79-280 µm.

According to this arrangement, because the mean value of the intervals between the groove parts having a predetermined depth or greater from the mean line is adjusted to be in the predetermined range, the frictional force when the sliding contact surface makes sliding contact with the prescribed member is reduced, and the lubricating oil can be retained more uniformly.

In the above arrangement, preferably, the member having the sliding contact surface is a cylinder block (2) used in an internal combustion engine (1), and the sliding contact surface is an inner peripheral wall surface of a cylinder bore (3).

According to this arrangement, it is possible to constitute an inner peripheral wall surface of a cylinder bore of an internal combustion engine, wherein the frictional force when making sliding contact with the piston is reduced, and the lubricating oil can be retained more uniformly.

To achieve the above object, there is provided a method of evaluating a member having a sliding contact surface provided with flat plateau parts and groove parts and configured to make sliding contact with a prescribed member via a lubricant, the method being configured to evaluate a time to seizure and an energy loss per unit time due to friction between the member having the sliding contact surface and the prescribed member, the method comprising calculating a mean line (54) by removing groove parts from a cross-sectional curve (50) of the sliding contact surface and applying a prescribed filter thereon according to ISO 13565-1, and evaluating a mean value of intervals between the groove parts of the sliding contact surface having a depth greater than or equal to a predetermined threshold value with respect to the mean line in a predetermined area of the sliding surface.

According to this method, by obtaining intervals of the groove parts having a depth from the mean line that has a sufficient correlation with the friction between the member having the sliding contact surface and the prescribed member and with the time to seizure, and evaluating the mean value of the intervals in the predetermined area, it is possible to evaluate the time to seizure and energy loss per unit time due to friction.

Preferably, the predetermined threshold value is 0.2 µm.

According to this method, it is possible to obtain the intervals of the groove parts having a depth that has a sufficient correlation with the friction between the member having the sliding contact surface and the prescribed member and with the time to seizure.

Effect of the Invention

According to the above arrangement, it is possible to provide a member having a sliding contact surface such that the sliding contact surface exerts a reduced frictional force when making sliding contact with a prescribed member and retains the lubricating oil more uniformly.

MODE(S) FOR CARRYING OUT THE INVENTION

In the following, an embodiment in which a member having a sliding contact surface according to the present invention is applied to an internal combustion engine will be described with reference to FIGS. 1 to 9.

Figure 1:
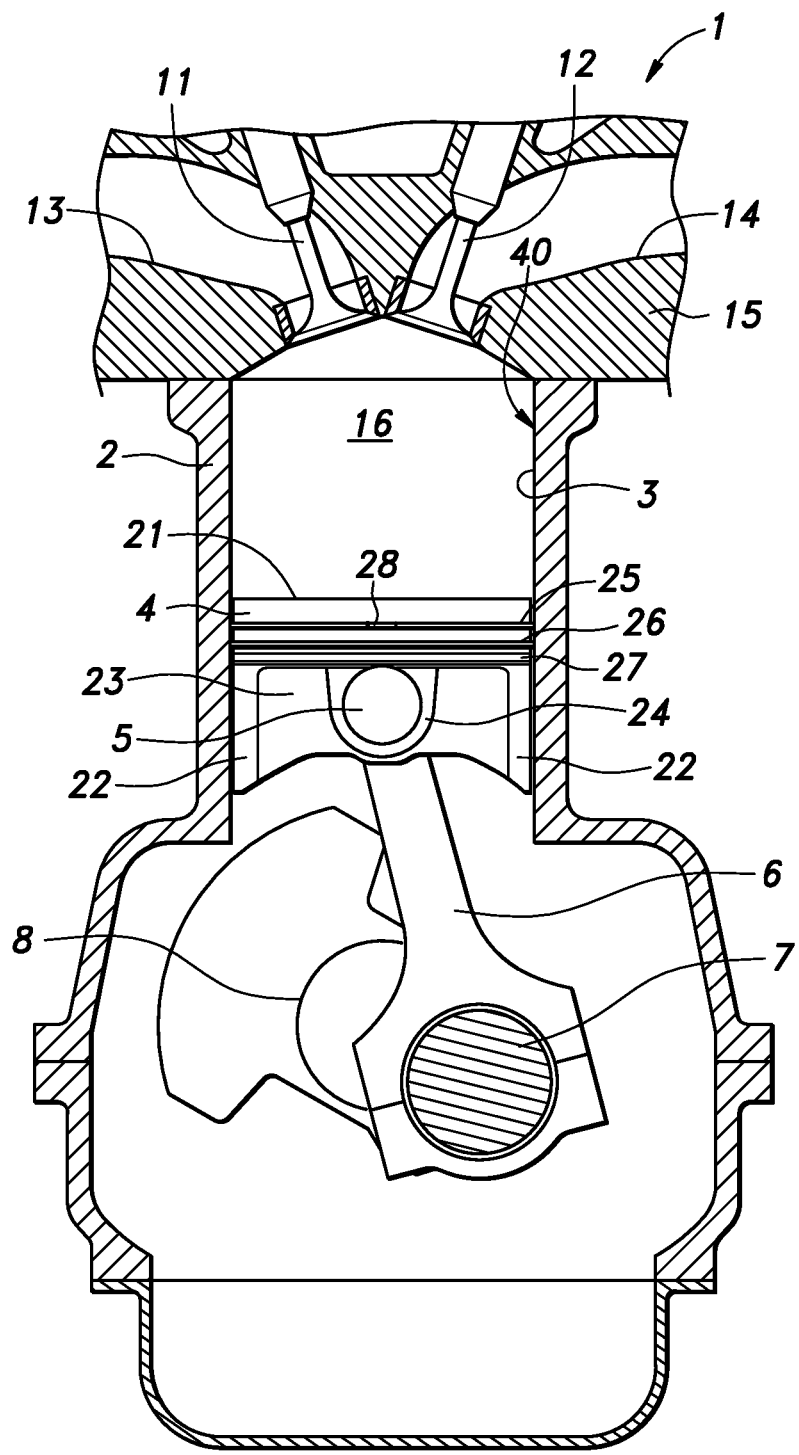
FIG. 1 is a schematic diagram of an internal combustion engine to which a member having a sliding contact surface according to the present invention is applied.

An internal combustion engine 1 of the present invention consists of a four-stroke reciprocating engine. As shown in FIG. 1, in the engine 1, a cylinder block 2 is provided with a cylinder bore 3, and a piston 4 is slidably contained in the cylinder bore 3. The piston 4 is connected to an upper end of a connecting rod 6 via a piston pin 5, while a lower end of the connecting rod 6 is connected to a crankshaft 8 via a crank pin 7.

Joined to an upper side of the cylinder block 2 is a cylinder head 15 provided with an intake port 13 and an exhaust port 14, which are opened and closed by an intake valve 11 and an exhaust valve 12, respectively. An inner peripheral wall surface of the cylinder head 15, an upper surface of the piston 4, and the cylinder bore 3 jointly define a combustion chamber 16.

The piston 4 has a top portion 21 on which the combustion gas pressure acts, a pair of skirt portions 22 depending from the top portion 21, a pair of side wall portions 23 connecting the skirt portions 22 to each other, and a pair of pin boss portions 24 respectively provided on the side wall portions 23. The top portion 21 is provided with three piston rings 25 to 27 attached to an outer circumference thereof. It is to be noted that two piston rings 25 and 26 on the top side are compression rings having an end gap 28, while a piston ring 27 closest to the crankshaft 8 is an oil ring.

During the expansion stroke, when the combustion pressure pushes down the piston 4, the force applied to the piston 4 is transmitted to the connecting rod 6, and at the same time, the piston 4 receives a lateral pressure from an inner peripheral wall surface of the cylinder bore 3, particularly from a thrust-side part of the inner peripheral wall surface of the cylinder bore 3. As a result, an oil film thickness of the lubricating oil in a gap between the thrust-side skirt portion 22 of the piston 4 and the cylinder bore 3 becomes small and a boundary lubrication condition is caused, so that friction occurs between the skirt portion 22 and the cylinder bore 3. In addition, outer peripheral surfaces of the piston rings 25 and 26 slidingly contact the inner peripheral wall surface of the cylinder bore 3, and therefore, friction also occurs between them. In the present embodiment, the inner peripheral wall surface of the cylinder bore 3 opposing the piston 4 and the outer peripheral surfaces of the piston rings 25 and 26 serves as a sliding contact surface 40 that makes sliding contact with the piston 4 and the outer peripheral surfaces of the piston rings 25 and 26. Namely, the cylinder block 2 formed with the cylinder bore 3 having the sliding contact surface 40 serves as a member having a sliding contact surface.

Figure 2:
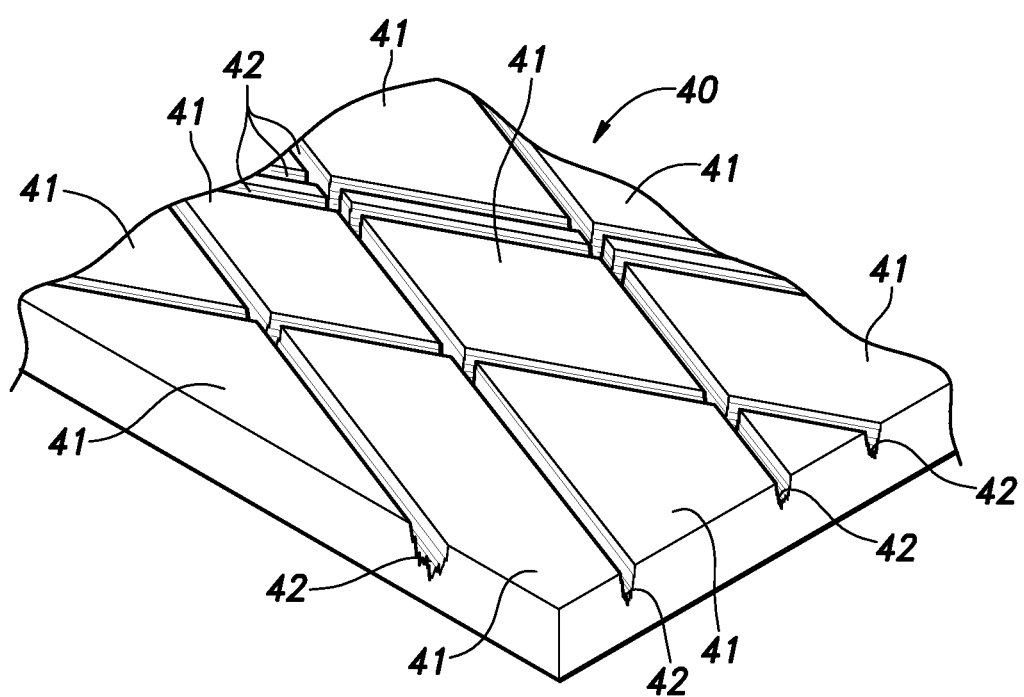
FIG. 2 is an enlarged view of a sliding contact surface according to the present invention.

As shown in FIG. 2, the inner peripheral wall surface of the cylinder bore 3 serving as the sliding contact surface 40 is formed with a plurality of substantially flat plateau surface parts 41 formed to have a substantially same height and groove parts 42 each formed between adjoining ones of the plateau surface parts 41. The groove parts 42 serve to retain lubricating oil for preventing seizure of the cylinder bore 3.

Figure 3A:
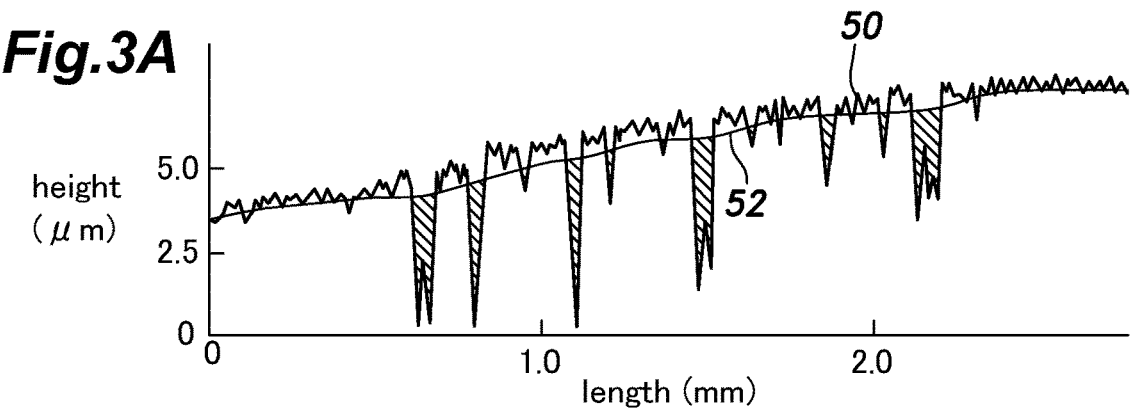
FIG. 3 is an explanatory diagram for explaining a method to obtain a roughness curve.

A cross-sectional curve 50 is measured at twelve positions on the inner peripheral wall surface of the cylinder bore 3 including four positions spaced apart from one another by about 90 degrees in the circumferential direction in each of three vertical areas of the cylinder bore 3 consisting of an area opposing the piston 4 at the top dead center, an area opposing the piston 4 at an intermediate position between the top dead center and the bottom dead center, and an area opposing the piston 4 at the bottom dead center. The cross-sectional curve 50 is used to evaluate the roughness of a surface and represents a vertical distribution of measurement values of the height from a predetermined reference surface. FIG. 3A shows an example of the cross-sectional curve 50 obtained in that way. This example is copied from ISO 13565-1.

Figure 3B:
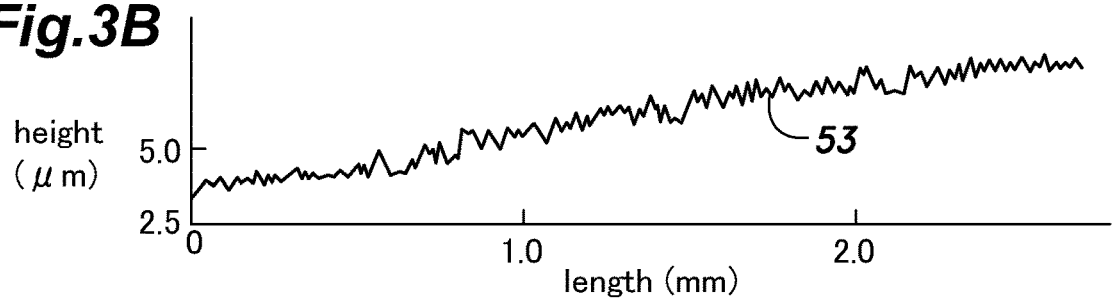
Figure 3C:
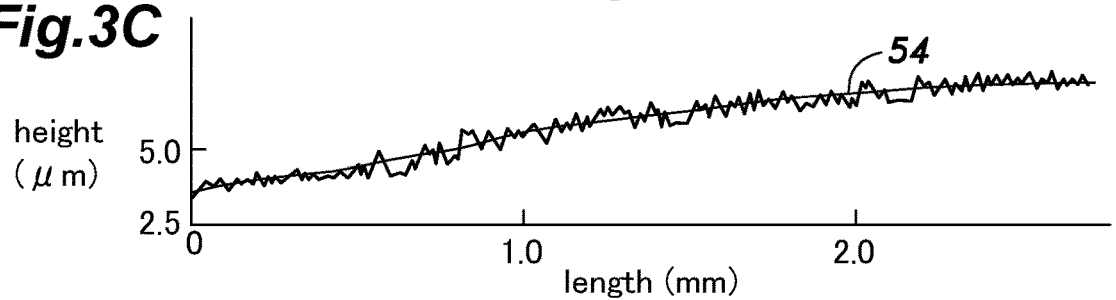
Figure 3D:
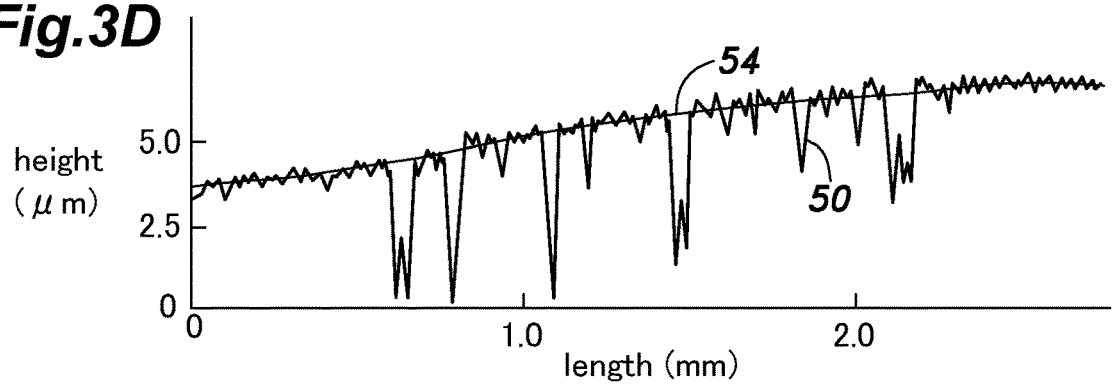
Figure 3E:
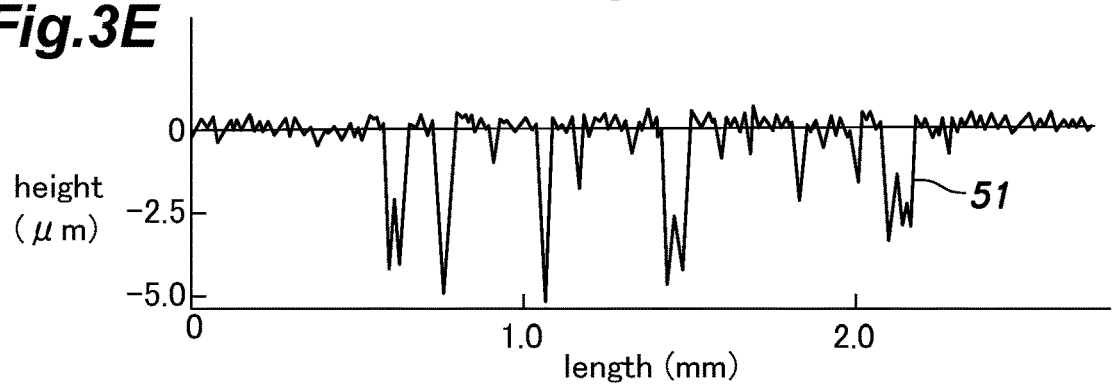

Gaussian phase compensation filter having a cutoff wavelength λC of 0.8 mm is applied on the cross-sectional curve 50 to obtain a reference filter mean line 52. Subsequently, by removing parts of the cross-sectional curve 50 below the reference filter mean line 52, a valley-removed cross-sectional curve 53 as shown in FIG. 3B is obtained. Gaussian phase compensation filter is applied on the valley-removed cross-sectional curve 53, whereby a mean line 54 shown in FIG. 3C is obtained. FIG. 3D shows the cross-sectional curve 50 and the mean line 54 on the same graph. Lastly, by subtracting the mean line 54 from the cross-sectional curve 50, a roughness curve 51 as shown in FIG. 3E is obtained.

Figure 4:
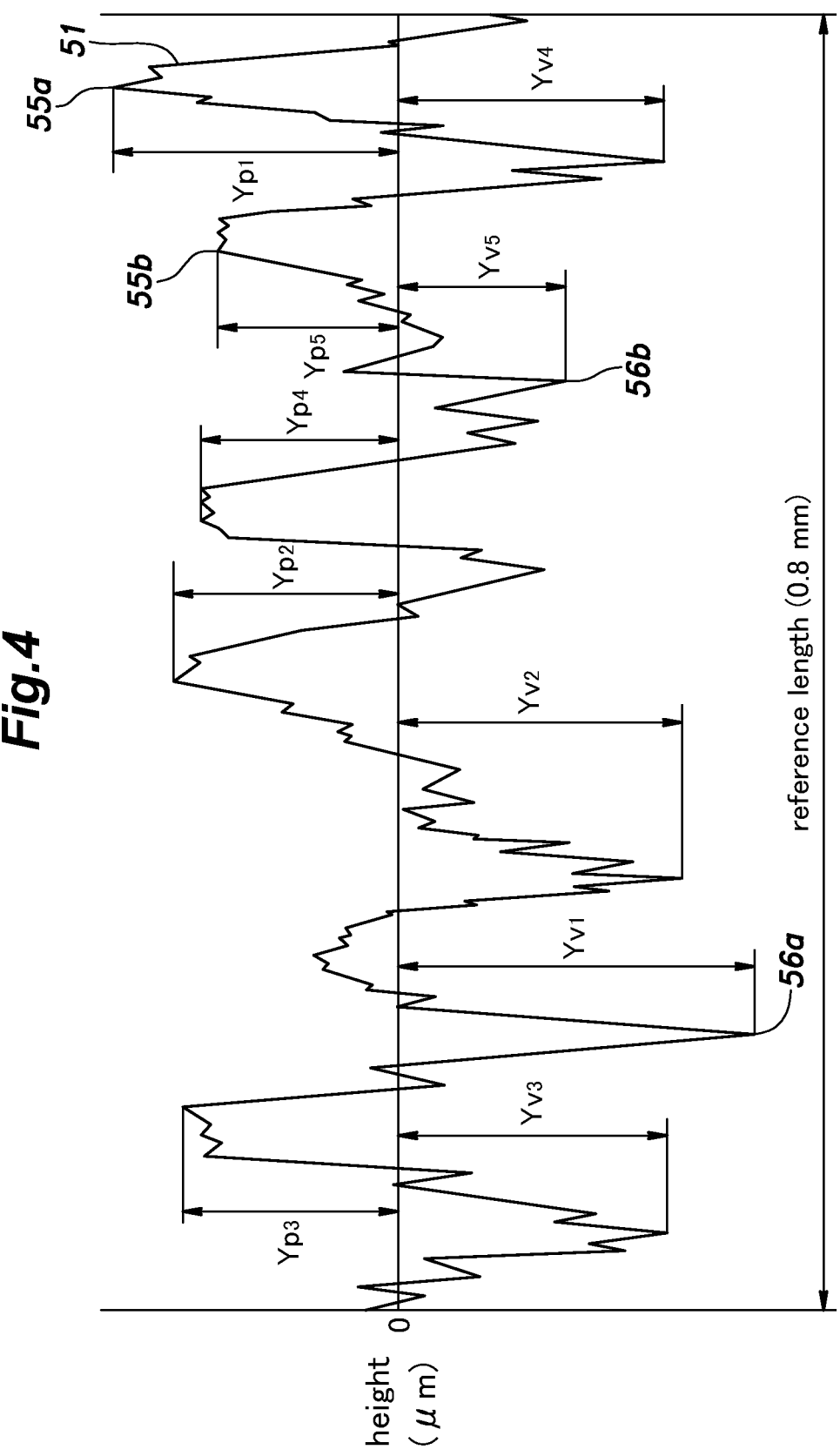
FIG. 4 is an explanatory diagram for explaining a definition of a ten-point average roughness.

First, a ten-point average roughness Rz is obtained from the roughness curve 51 according to JIS B0601:2001. As shown in FIG. 4, the ten-point average roughness Rz is obtained for a part of the roughness curve 51 set over a reference length (0.8 mm) in the vertical direction as a sum of an average of absolute values of heights of the first to fifth highest projecting parts 55*a* to 55*b* (distances $Y_{p1}$ to $Y_{p5}$ from the mean line 54 to the tops of the respective projecting parts) and an average of absolute values of depths of the first to fifth lowest recessed parts 56*a* to 56*b* (distances $Y_{v1}$ to $Y_{v5}$ from the mean line 54 to the bottoms of the respective recessed parts). Namely, Rz can be expressed by Equation (1) below:

$$Rz = \frac{|Y_{p1} + Y_{p2} + Y_{p3} + Y_{p4} + Y_{p5}|}{5} + \frac{|Y_{v1} + Y_{v2} + Y_{v3} + Y_{v4} + Y_{v5}|}{5} \quad (1)$$

Preferably, configuration is made such that the ten-point average roughness Rz of the inner peripheral wall surface of the cylinder bore 3 is 0.6-7.0 µm. If Rz is less than 0.6 µm, the recessed parts 56 become shallow and therefore unable to sufficiently retain the lubricating oil. Namely, the lubricating oil retaining ability of the sliding contact surface 40 becomes poor. On the other hand, if it exceeds 7.0 µm, the frictional resistance of the sliding contact surface 40 becomes high.

Figure 5:
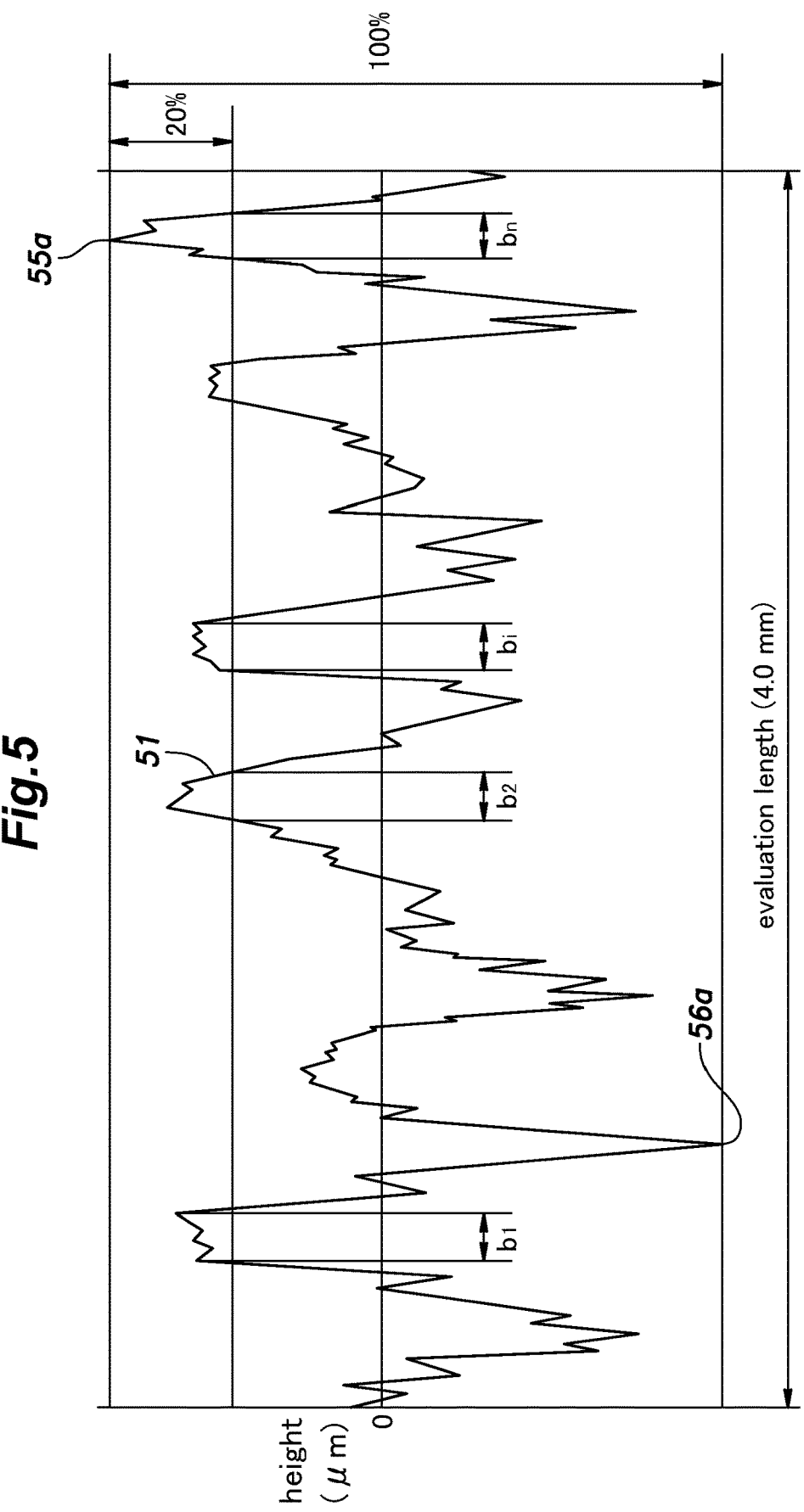
FIG. 5 is an explanatory diagram for explaining a definition of a load length ratio.

Next, in order to evaluate the ratio of the plateau surface parts 41 to the entirety, a load length ratio Rmr (20) is obtained in accordance with ISO 4287. As shown in FIG. 5, the load length ratio Rmr (20) is the ratio in percentage of a total of cut lengths ($b_1$, $b_2$, $b_i$, ... $b_n$ in FIG. 5) of the projecting parts of the roughness curve 51 at a cut level of 20% to an evaluation length (4.0 mm), where the cut length is given as a height in percentage, with the height of the highest projecting part 55*a* corresponding to 100% and the height of the lowest recessed part 56*a* corresponding to 0%. Namely, the load length ratio Rmr (20) can be expressed by Equation (2) below:

$$Rmr(20) = \left\{ \frac{b_1 + b_2 + \cdots + b_i + \cdots + b_n}{4.0} \right\} \times 100 \quad (2)$$

Preferably, configuration is made such that the load roughness Rmr (20) of the sliding contact surface 40 at the cut level of 20% is in a range of 60-98%. If the load roughness Rmr (20) is less than 60%, the frictional resistance of the sliding contact surface 40 becomes large. On the other hand, if it exceeds 98%, the number of the recessed parts 56 becomes excessively small. Namely, the number of oil pits becomes small, and therefore, the lubricating oil retaining ability of the sliding contact surface 40 becomes poor.

In general, the load length ratio Rmr is given as a function of the cut level. In the following, the value of Rmr when the cut level is x % is expressed as Rmr (x). For example, the load length ratio at the cut level of 0% is expressed as Rmr (0), which is always equal to 100%.

Figure 6:
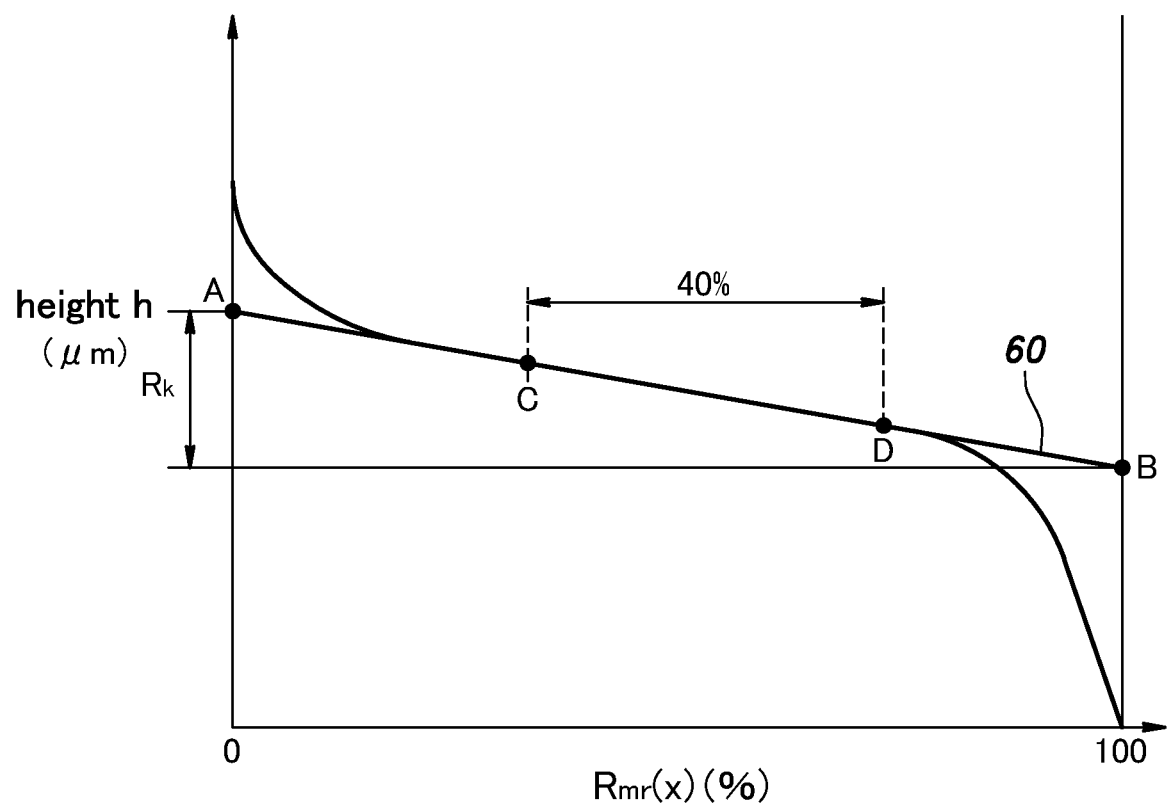
FIG. 6 is an explanatory diagram for explaining a definition of an effective load roughness.

Next, an effective load roughness Rk, which is known as a parameter for evaluating lubricity of a plateau-structure surface, is evaluated in accordance with ISO 13565-2. As shown in FIG. 6, with the height of the top of the highest projecting part 55*a* corresponding to 100%, and the height of the bottom of the lowest recessed part 56*a* corresponding to 0%, a graph is formed by plotting a height h in the roughness curve 51 corresponding to x % on the vertical axis and the load length ratio Rmr (x) on the horizontal axis. Further, two points (points C and D) which are spaced apart in the direction of the horizontal axis (load length ratio Rmr (x)) by 40% are determined such that the gradient of the height h between the two points is minimized. Thereby, by connecting the points C and D, a minimum gradient line 60 is obtained. Subsequently, points of intersection A, B where the minimum gradient line 60 intersects with limit lines (the load length ratio Rmr (x)=0 and Rmr (x)=100) are obtained. The effective load roughness Rk is obtained by calculating a difference between the points of intersection in the vertical axis direction.

Preferably, configuration is made such that the effective load roughness Rk of the inner peripheral wall surface of the cylinder bore 3 is less than or equal to 1 µm. If the effective load roughness Rk is greater than 1 µm, the frictional resistance of the sliding contact surface 40 becomes high.

Figure 7:
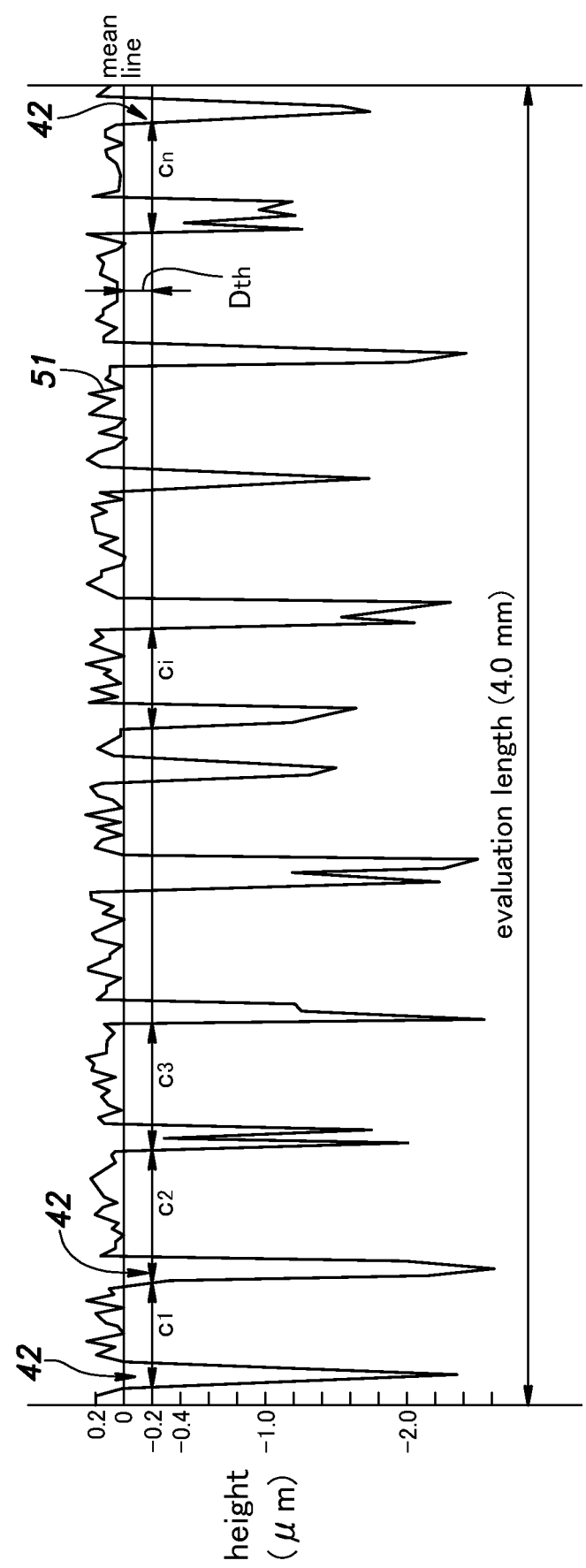
FIG. 7 is an explanatory diagram for explaining a definition of intervals between groove parts.

As shown in FIG. 7, the groove parts 42 are defined as parts having a depth greater than or equal to a certain threshold value from the mean line 54 (FIG. 3). A mean value d of intervals between the groove parts 42 is defined as a mean value of the lengths ($c_1$, $c_2$, ... $c_i$, ... $c_n$ in FIG. 7) of parts of the evaluation length each extending from the start of a corresponding groove part 42 to the start of the next groove part 42; namely, a mean value of the wavelength (spatial period) of the groove parts 42.

Preferably, configuration is made such that the mean value d of the intervals between the groove parts 42 of the sliding contact surface 40 is 79-280 µm. If the mean value d is less than 79 µm, the sliding resistance between the piston 4 and the cylinder bore 3 increases due to the groove parts 42. If the mean value d is greater than 280 µm, the intervals of the groove parts 42 become excessively large so that it becomes difficult to retain the lubricating oil uniformly.

A preferable value and range of a depth threshold value $D_{th}$ for defining the groove parts 42 of the sliding contact surface 40 and the mean value d of the intervals between the groove parts 42 are determined as follows. First, one cylinder block 2 having one cylinder bore 3 and serving as a reference and nine cylinder block 2 each having one cylinder bore 3 and serving as a sample were prepared. The cylinder bores 3 were formed such that the intervals of the groove parts 42 and/or the depths of the groove parts 42 differ between the cylinder bores.

Next, to evaluate the roughness of the inner peripheral wall surface of each cylinder bore 3 (i=1 to 9) serving as a sample, a cross-sectional curve 50 of the inner peripheral wall surface of each cylinder bore 3 was measured. For each measured cross-sectional curve 50, groove parts 42 were removed and a filter was applied in accordance with ISO 13565-1 to obtain a mean line 54 and a roughness curve 51. Subsequently, by using the roughness curve 51 obtained for each cylinder bore 3, a ten-point average roughness Rz, a load length ratio Rmr (20) at a cut level of 20%, and an effective load roughness Rk were obtained. Further, for each roughness curve 51, a mean value di ($D_{th}$) (i=1 to 9) of intervals between the groove parts 42 corresponding to the threshold value $D_{th}$ in the evaluation length was obtained for each value of the threshold value $D_{th}$ from 0 µm to 0.5 µm with an interval of 0.1 µm.

Subsequently, an engine 1 was constituted using the cylinder block 2 having the cylinder bore 3 serving as a reference, and motoring test was conducted under a condition of a rotation speed of 1500 rpm and an oil temperature of 80 degrees Celsius to measure an energy loss per unit time due to friction. Further, an engine 1 was constituted using each cylinder block 2 serving as a sample, and a similar motoring test was conducted to measure an energy loss per unit time due to friction for each engine 1. Then, the energy loss per unit time due to friction measured in each engine 1 having the cylinder bore 3 serving as a sample was subtracted from the energy loss per unit time due to friction in the engine 1 having the cylinder bore 3 serving as a reference to obtain a friction reducing effect $W_i$ (i=1 to 9) for each engine 1.

Further, $d_{av}$ (Dth) was obtained by averaging the mean value di ($D_{th}$) of the intervals between the groove parts 42 corresponding to the respective values of the threshold value $D_{th}$ over the number of samples. Also, $W_{av}$ was obtained by averaging the friction reducing effect $W_i$ over the number of cylinder bores. By using these values, a correlation coefficient $\rho_w$ ($D_{th}$) between the interval of the groove parts 42 and the friction reducing effect was obtained according to the following equation:

Then, the ten-point average roughness Rz, the load length ratio Rmr (20) at the cut level of 20%, the effective load roughness Rk, the mean value d of the intervals between the groove parts 42 of each cylinder bore 3 when the threshold value Dth is 0.2 μm, the friction reducing effect W, and the time to seizure T, which were obtained for each cylinder bore 3, were summarized in Table 1. In addition, the mean value d of the intervals between the groove parts 42 was plotted on the horizontal axis, and the friction reducing effect W (W) and the time to seizure T (sec) were plotted on the vertical axis in FIG. 9.

TABLE 1

| sample No. | ten-point average roughness Rz (μm) | load length ratio Rmr (20) (%) | effective load roughness Rk (μm) | mean value of intervals between groove parts d (μm) | friction reducing effect W (w) | time to seizure T (sec) |
|---|---|---|---|---|---|---|
| | judgment condition | | | | | |
| | $0.6 \leq Rz \leq 7$ | $60 \leq Rmr (20) \leq 98$ | $0 \leq Rk \leq 1.0$ | $79 \leq d \leq 280$ | $W \geq 10$ | $T \geq 260$ |
| 1 | ○ (3.0) | ○ (89) | ○ (0.35) | ○ (79) | ○ (10) | ○ (T ≥ 260) |
| 2 | ○ (4.4) | ○ (88) | ○ (0.26) | ○ (90) | ○ (14) | ○ (T ≥ 260) |
| 3 | ○ (2.4) | ○ (95) | ○ (0.07) | ○ (152) | ○ (25) | ○ (T ≥ 260) |
| 4 | ○ (2.0) | ○ (94) | ○ (0.14) | ○ (276) | ○ (38) | ○ (T ≥ 260) |
| 5 | ○ (2.6) | ○ (86) | ○ (0.39) | X (57) | X (3) | ○ (T ≥ 260) |
| 6 | ○ (3.5) | ○ (78) | ○ (0.43) | X (68) | X (5) | ○ (T ≥ 260) |
| 7 | ○ (1.8) | ○ (94) | ○ (0.14) | X (303) | ○ (40) | X (244) |
| 8 | ○ (1.6) | ○ (97) | ○ (0.12) | X (348) | ○ (44) | X (218) |
| 9 | ○ (2.88) | X (55) | ○ (0.94) | X (30) | X (2) | ○ (T ≥ 260) |

$$\rho_W(D_{th}) = \frac{\sum_{i=1}^{9}(d_i(D_{th}) - d_{av}(D_{th}))(W_i - W_{av})}{\sqrt{\sum_{i=1}^{9}(d_i(D_{th}) - d_{av}(D_{th}))^2}\sqrt{\sum_{i=1}^{9}(W_i - W_{av})^2}} \quad (3)$$

Further, for each engine 1 using the cylinder block 2 serving as a sample, anti-seizure test was conducted using unit test pieces under a condition of a frequency of 20 Hz and an oil temperature of 80 degrees Celsius to obtain a time to seizure $T_i$ (sec) (i=1 to 9). The time to seizure is a time till seizure between the piston 4 and the cylinder bore 3 occurs.

By averaging the obtained time to seizure $T_i$ over the number of samples, a mean value $T_{av}$ was obtained. Then, by using $T_{av}$ and $d_{av}$ ($D_{th}$) corresponding to each value of the threshold value $D_{th}$, a correlation coefficient $\rho_T$ ($D_{th}$) between the interval of the groove parts 42 and the time to seizure was obtained according to the following equation:

$$\rho_T(D_{th}) = \frac{\sum_{i=1}^{9}(d_i(D_{th}) - d_{av}(D_{th}))(T_i - T_{av})}{\sqrt{\sum_{i=1}^{9}(d_i(D_{th}) - d_{av}(D_{th}))^2}\sqrt{\sum_{i=1}^{9}(T_i - T_{av})^2}} \quad (4)$$

Figure 8:
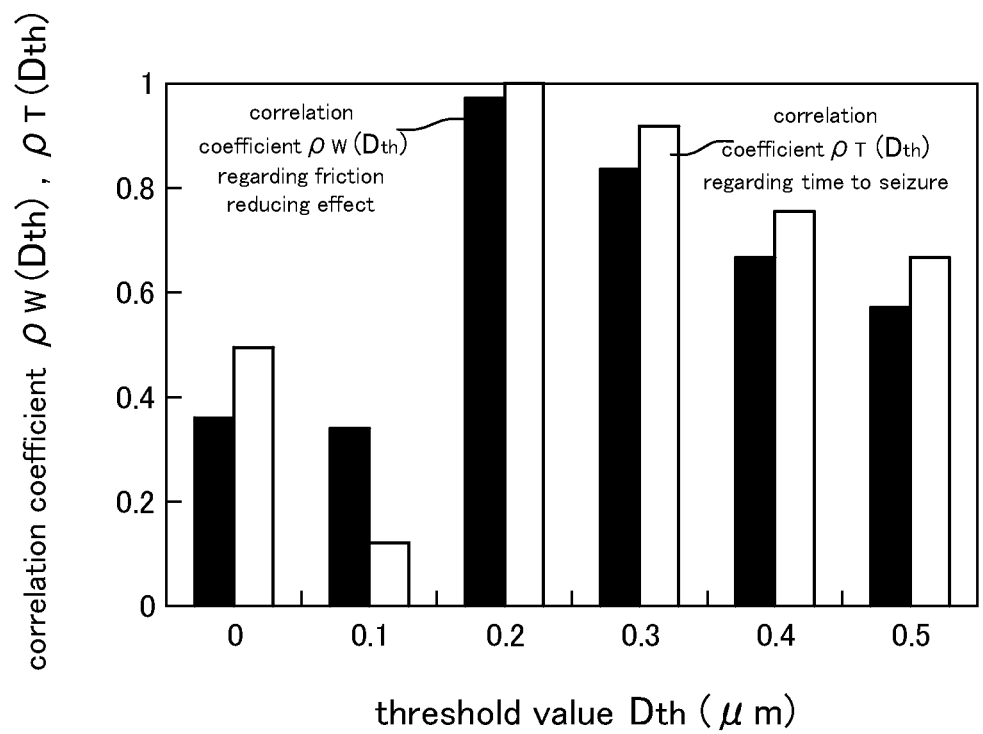
FIG. 8 is a diagram showing a change of a correlation coefficient regarding a friction reducing effect and a correlation coefficient regarding time to seizure with respect to a threshold value.

Subsequently, to determine a preferred value of the threshold value $D_{th}$, the threshold value $D_{th}$ was plotted on the horizontal axis and $\rho_w$ ($D_{th}$) and $\rho_T$ ($D_{th}$) were plotted on the vertical axis to obtain FIG. 8. It is preferred that the threshold value $D_{th}$ exhibits strong correlation with both the friction reducing effect W and the time to seizure T. As shown in FIG. 8, when $D_{th}$ is 0.2 μm, both $\rho_w$ ($D_{th}$) and $\rho_T$ ($D_{th}$) are large, and therefore, it was determined that 0.2 μm is preferred as a value of the threshold value $D_{th}$.

It is judged that the energy loss due to friction is reduced sufficiently if the friction reducing effect W is 10 W or greater. Also, it is judged that seizure between the cylinder bore 3 and the piston 4 can be avoided if the time to seizure T is 260 sec or longer. According to Table 1, it is shown that when the sliding contact surface 40 is formed such that the ten-point average roughness Rz is 0.6-7.0 μm, the load length ratio Rmr (20) at the cut level of 20% is 60-98%, the effective load roughness Rk is 0-1 μm, and the mean value d of the intervals between the groove parts 42 having a depth of 0.2 μm or greater from the mean line 54 is 79-280 μm, the energy loss due to friction is suppressed and seizure between the piston 4 and the cylinder bore 3 can be avoided.

Figure 9:
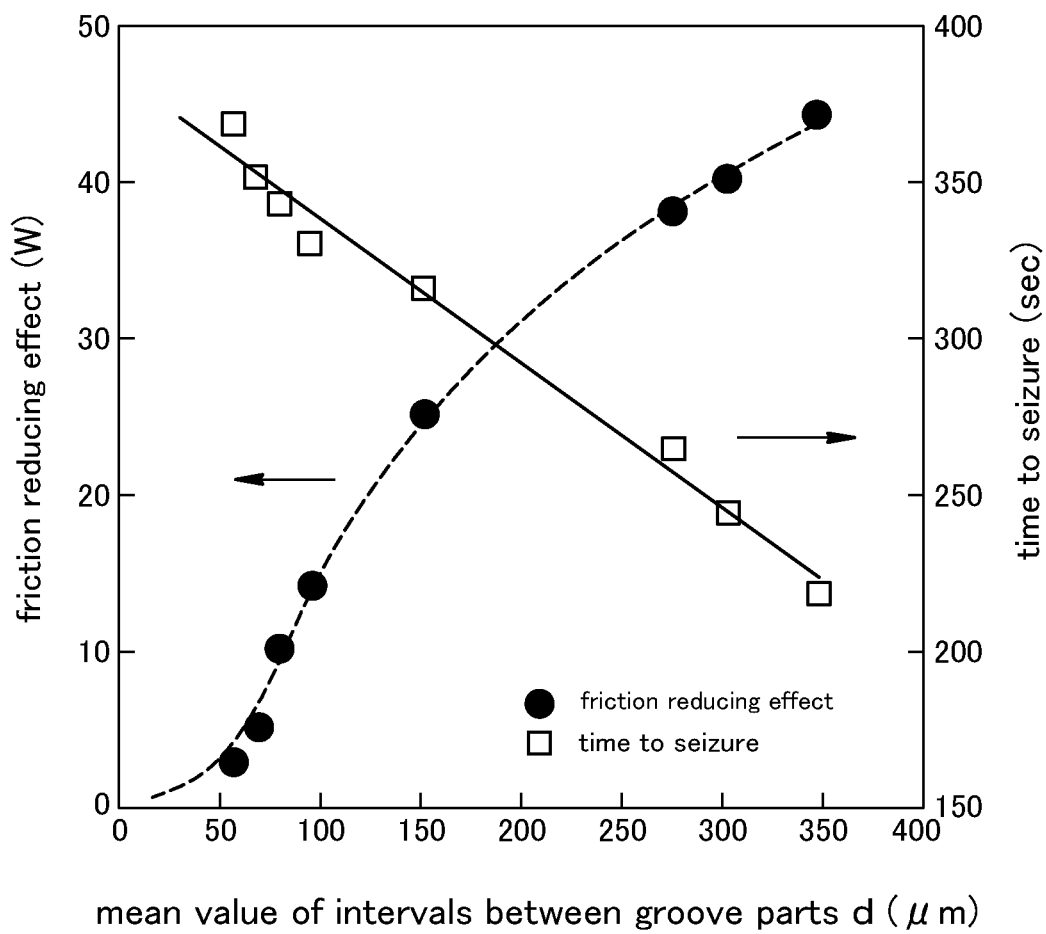
FIG. 9 is a diagram showing a relationship between the intervals between the groove parts having a depth of 0.2 μm or greater from the mean line, the friction reducing effect, and the time to seizure.

In addition, with reference to FIG. 9, as the mean value d of the intervals between the groove parts 42 increases, the time to seizure T reduces but the friction reducing effect W increases. On the other hand, as the mean value d of the intervals between the groove parts reduces, the time to seizure T increases but the friction reducing effect W decreases. It can be understood that the friction reducing effect W is 10 W or greater and the time to seizure T is 260 or longer when the mean value d of the intervals between the groove parts 42 is 79-280 μm.

Next, description will be made of machining of the inner peripheral wall surface of the cylinder bore 3. The inner peripheral wall surface of the cylinder bore 3 is a honed surface formed by two stages of honing comprising rough machining using at least two kinds of honing stones and finish machining performed after the rough machining. The honing stones used in the rough machining have abrasive grains of diamond of 140-270 mesh, preferably, consist of metal bond diamond honing stones having diamond grains of 230 mesh bonded together by metal bond consisting of an alloy of copper, tin, iron, cobalt, nickel, tungsten, etc. The number of honing operations is 30-60 times, preferably, 40 times.

The honing stones used in the finish machining have metal bonded diamond grains of 1500-3500 mesh, and preferably consist of vitrified bond honing stones of 3000 mesh. The number of honing operations is 20-200 times, and preferably, 150 times.

Figure 10:
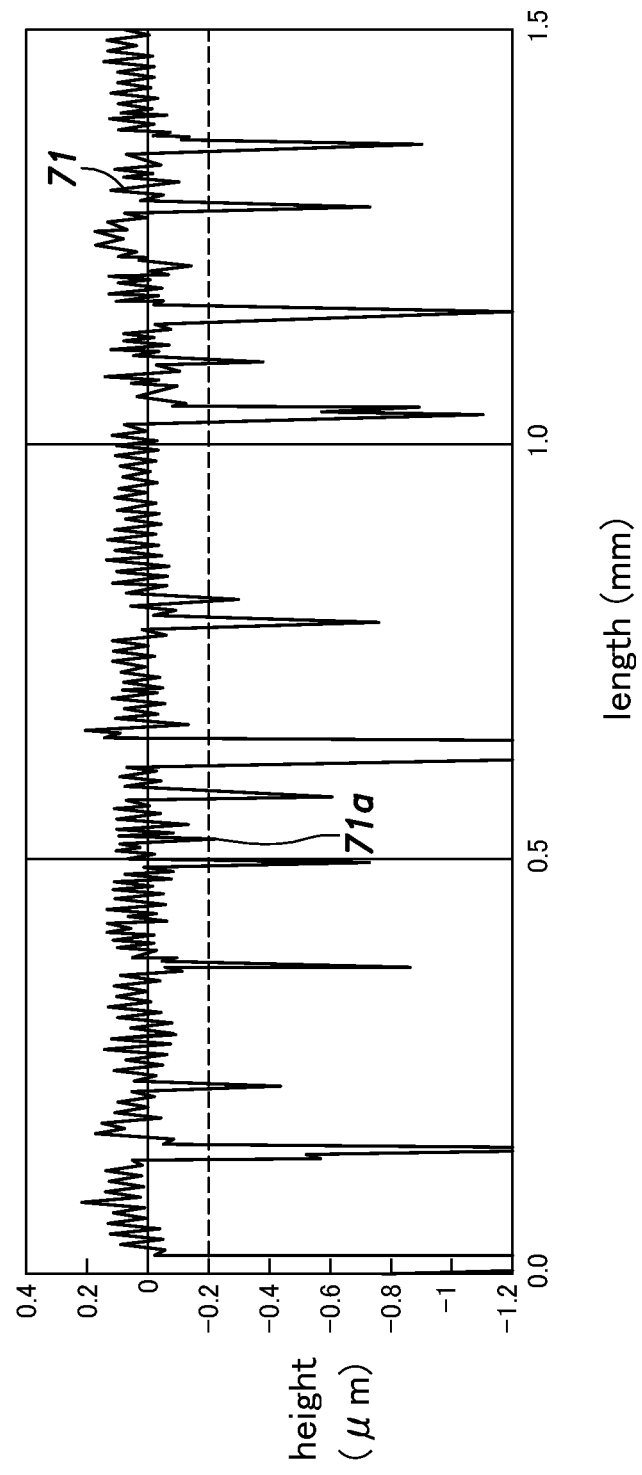
FIG. 10 is a roughness curve of the member having a sliding contact surface according to the embodiment.

A cross-sectional curve 50 of an inner peripheral wall surface of a cylinder bore 3 that has been processed by the aforementioned rough machining and finish machining was measured, and an important part of a roughness curve 71 obtained in accordance with ISO 13565-1 is shown in FIG. 10. In FIG. 10, a height corresponding to a depth of 0.2 μm from the mean line 54 is shown by a broken line. The resolution of the roughness curve 71 in the height direction is approximately 0.01 μm, and the groove parts 42 (for example, 71a in FIG. 10) having a depth deeper than 0.2 μm are detected and evaluated. The height of the mean line 54 is approximately near the plateau surface parts 41, but the height changes in dependence on the groove parts 42.

As calculated using the roughness curve 71, the ten-point average roughness Rz is 2.0 μm, the value of the load length ratio Rmr (20) at the cut level of 20% is 94%, the mean value d of the intervals between the groove parts 42 having a depth of 0.2 μm or greater from the mean line 54 is 276 μm.

A motoring test was conducted for an engine 1 having the cylinder bore 3 that has been processed by the aforementioned rough machining and finish machining, with a result that the measured friction reducing effect W was 38 W. This confirmed that a sufficient friction reducing effect was achieved. Further, anti-seizure test was conducted for the engine 1, with a result that the measured time to seizure T was 260 sec or longer. This confirmed that sufficient anti-seizure performance was achieved.

On the other hand, it cannot be expected that an engine 1 having a cylinder bore 3 corresponding to a roughness curve CV1 shown in FIG. 6 of Japanese Patent No. 4678802 may achieve a sufficient friction reducing effect W and a sufficiently long time to seizure T. This is because, in the roughness curve CV1, the resolution in the height direction is approximately 0.4 μm, and hence, the resolution in the height direction is insufficient, and it is not possible to accurately detect the groove parts 42 having a depth of about 0.2 μm. In addition, there is no description that the roughness curve CV1 is a roughness curve obtained according to ISO 13565-1, and it is not clear how to obtain the mean line 54 for determining the groove parts 42. Therefore, in the engine 1 having the cylinder bore 3 corresponding to the roughness curve CV1, the mean value d of the intervals between the groove parts calculated using the mean line obtained according to ISO 13565-1 is not in the range of 79-280 μm.

A concrete embodiment of the present invention has been described in the foregoing, but the present invention is not limited to the embodiment and may be modified or altered in various ways. The member having a sliding contact surface was described as the cylinder block 2, but it may be any member with which a prescribed member may make a slidingly contact via lubricating oil.

Glossary

1 internal combustion engine
2 cylinder block
3 cylinder bore
4 piston
40 sliding contact surface

The invention claimed is:
1. A member having a sliding contact surface configured to make sliding contact with a prescribed member via a lubricant,
   wherein the sliding contact surface is a honed surface having flat plateau parts and groove parts recessed from the flat plateau parts, and
   wherein, as calculated in regard to the sliding contact surface by using a mean line derived from a cross-sectional curve of the sliding contact surface in accordance with ISO 13565-1, a ten-point average roughness is 0.6-7.0 μm and an effective load roughness is 0-1 μm, wherein the groove parts are distributed on the sliding contact surface such that a load length ratio at a cut level of 20% is 60-98% and a mean value of intervals between the groove parts having a depth of 0.2 μm or greater from the mean line is 79-280 μm.
2. The member having the sliding contact surface according to claim 1, wherein the member having the sliding contact surface is a cylinder block used in an internal combustion engine, and the sliding contact surface is an inner peripheral wall surface of a cylinder bore.

* * * * *